(12) United States Patent
Nihei

(10) Patent No.: US 6,810,437 B1
(45) Date of Patent: Oct. 26, 2004

(54) PERIPHERAL UNIT FOR A PROGRAMMABLE CONTROLLER

(75) Inventor: Takayuki Nihei, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/700,973

(22) PCT Filed: May 25, 1999

(86) PCT No.: PCT/JP99/02737

§ 371 (c)(1),
(2), (4) Date: Nov. 21, 2000

(87) PCT Pub. No.: WO00/72099

PCT Pub. Date: Nov. 30, 2000

(51) Int. Cl.[7] .................................... G06F 3/00
(52) U.S. Cl. ...................... 710/15; 710/17; 710/19; 700/17
(58) Field of Search ............... 710/15, 17, 19; 700/17

(56) References Cited

U.S. PATENT DOCUMENTS 5,889,669 A * 3/1999 Kagami et al. ............... 700/17

FOREIGN PATENT DOCUMENTS

| JP | SHO60-217411 | 10/1985 |
| JP | A 60-217411 | 10/1985 |
| JP | HEI4-160407 | 6/1992 |
| JP | 06-175844 | 6/1994 |
| JP | A 8-272428 | 10/1996 |
| JP | HEI8-272428 | 10/1996 |
| JP | HEI9-222908 | 8/1997 |
| KP | 92-21966 | 12/1992 |

* cited by examiner

Primary Examiner—Jeffrey Gaffin
Assistant Examiner—Justin Knapp
(74) Attorney, Agent, or Firm—Sughrue Mion, PLLC

(57) ABSTRACT

A monitor request instruction issuing-side shared memory (14) into which a list of devices to be monitored based on monitoring requests is provided between a monitoring application executing-section (11) and a monitor request instruction issuing unit (13). A monitor data obtaining-side shared memory (16) into which monitor data obtained by a monitor data obtaining unit (15) is written is provided between the monitoring application executing-section (11) and the monitor data obtaining unit (15). Thus, the monitor request instruction issuing unit (13), the monitor data obtaining unit (15), and the monitoring application executing-section (11) can operate mutually asynchronously. Further, a data flow is made in one direction, and an exclusive control relating to share memories can be minimized.

6 Claims, 7 Drawing Sheets

PERIPHERAL UNIT FOR A PROGRAMMABLE CONTROLLER

TITLE OF THE INVENTION

A peripheral unit for a programmable controller

1. Technical Field

The present invention relates to a peripheral unit for a programmable controller. More particularly, this invention relaters to a peripheral unit for a programmable controller that monitors a device of a programmable controller by communications.

2. Background Art

A peripheral unit for a programmable controller that monitors a device based on a device value of the programmable controller obtained by serial communications or the like is known.

A general structure of a conventionally known peripheral unit for monitoring will be explained with reference to FIG. 7. The peripheral unit 100 connected to a programmable controller 50 to be monitored by a communication table 120 so that it is possible to communicate in two directions.

The peripheral unit 100 is constructed of a monitoring application executing-section 101 for monitoring a device of the programmable controller 50, an application interface section 102, monitor request instruction issuing unit 103 for issuing a monitor request instruction to the programmable controller 50, monitor data obtaining unit 104 for obtaining monitor data from the programmable controller 50, and communication unit 105 for communicating with the programmable controller 50.

In the conventional peripheral unit 100, the monitoring application executing-section 101 delivers a list of a device to be monitored to the application interface section 102. The monitor request instruction issuing unit 103 issues a monitor request instruction to the programmable controller 50 via the communication unit 105 based on the device list received by the application interface section 102. The programmable controller 50 returns a value of the device in the delivered monitor device list to the monitor data obtaining unit 104 via the communication unit 50 according to the monitor request instruction received. The monitor obtaining unit 104 returns the received device value to the monitoring application 101 via the application interface section 102.

Each time when a list of a device to be monitored is delivered from the monitoring application executing-section 101, a series of processing from the issuing of a device monitor request instruction to the programmable controller 50 to the obtaining of a value of a device to be monitored from the programmable controller 50 are carried out in cascade. Therefore, there has been a problem in the conventional peripheral unit 100 that, for each monitoring request, a monitoring is kept waited until a value of a device to be monitored has been obtained from the programmable controller 50. Thus, response and efficiency of monitoring have been poor.

Therefore, the present invention has an object of providing a peripheral unit that monitors a device of a programmable controller efficiently and in good response.

DISCLOSURE OF THE INVENTION

The present invention can provide a peripheral unit for a programmable controller for monitoring a device of a programmable controller. The peripheral unit includes a monitor request instruction issuing-side shared memory into which a list of devices to be monitored is written according to a monitor request instruction of a monitoring application executing-section; a monitor request instruction issuing unit for issuing a monitor request instruction according to a content of the device list after the device list has been written into the monitor request instruction issuing-side shared memory; a communication unit for transmitting a monitor request instruction issued by the monitor request instruction issuing unit to the programmable controller and for receiving the monitor data according to the monitor request instruction from the programmable controller; a monitor data obtaining unit for obtaining the monitor data received from the programmable controller; and a monitor data obtaining-side shared memory into which the monitor data obtained by the monitor data obtaining unit is written, wherein the monitoring application executing-section is given the monitor data from the monitor data obtaining-side shared memory. Accordingly, the monitor request instruction issuing unit and the monitor data obtaining unit to the monitoring application executing-section are divided by the monitor request instruction issuing-side shared memory and the monitor data obtaining-side shared memory respectively. Thus, the monitor request instruction issuing unit, monitor data obtaining unit and the monitoring application executing-section can be operated mutually asynchronously. Further, a data flow becomes in one direction, and exclusive control relating to the shared memories can be minimized.

Further, the present invention can provide a peripheral unit for a programmable controller as follows. The monitor request instruction issuing-side shared memory has a rewrite-flag section for storing a rewrite-flag that shows a rewriting of the device list. The monitor request instruction issuing unit issues a monitor request instruction according to the contents of a new device list when a rewrite-flag of the monitor request instruction issuing-side shared memory has been stood and falls the last rewrite-flag, and continues to issue a monitor request instruction according to the contents of the last device list until when a next rewrite-flag of the monitor request instruction issuing-side shared memory has been stood. The monitor data obtaining-side shared memory has initialization flag section for storing a initialization flag that falls when a device list is changed and that stands when monitor data has been written into the monitor data obtaining-side shared memory after the device list has been changed, and a rewrite-flag section for storing a rewrite-flag that stands when monitor data of the monitor data obtaining-side shared memory has been rewritten by the monitor data obtaining unit and that falls when this monitor data has been read by the monitoring application executing-section. The monitoring application executing-section is given monitor data from the monitor data obtaining-side shared memory when both the initialization flag and the rewrite-flag of the monitor data obtaining-side shared memory have been stood, and is not given the monitor data from the monitor data obtaining-side shared memory when the initialization flag has fallen. Accordingly, it is possible to individually carry out flag control for a rewriting of the device list, a rewriting of monitor data (a device value), and a rewriting of monitor data after changing a device list, respectively. Thus, it is possible to carry out a required monitoring by minimizing data exchanges between the monitor request instruction issuing unit, the monitor data obtaining unit and the monitoring application executing-section.

Further, the present invention can provide a peripheral unit for a programmable controller as follows. The monitor data obtaining-side shared memory has a change flag table section for storing a device value change flag that is set for each device of a device list and that stands when a device value has changed and falls when a device value has been read. The monitor data obtaining unit updates only a device value of the monitor data obtaining-side shared memory for a device of which device value has changed, and stands a device value change flag. The monitoring application executing-section is given a device value of a device for which a device value change flag is standing, from the monitor data obtaining-side shared memory. Accordingly, a flag control of a device value change is carried out for each device. Monitor data of which device value has changed is delivered to the monitoring application executing-section in a device unit. Therefore, it is possible to minimize device values to be exchanged between the monitoring application executing-section and the monitor data obtaining unit.

Further, the present invention can provide a peripheral unit for a programmable controller as follows. A plurality of monitoring application executing-sections are provided as monitoring request origins. The monitor request instruction issuing-side shared memory and the monitor data obtaining-side shared memory are provided by a plurality of numbers respectively corresponding to the monitoring application executing-sections. The monitor request instruction issuing unit integrates the same devices based on request device lists of request origins and the programmable controller, thereby optimizing device lists. Accordingly, the monitor request instruction issuing unit can optimize device lists, and the processing at the monitoring application executing-section can be minimized. Further, it becomes possible to reduce transmission data to the programmable controller and to reduce frequency of communications.

Further, the present invention can provide a peripheral unit for a programmable controller as follows. There is provided timer monitoring unit for measuring a lapse time from when a monitor request instruction has been issued till when monitor data has been obtained. A predetermined monitoring cycle time is compared with a lapse time measured by the timer monitoring unit. When the lapse time is shorter than the monitoring cycle time, monitor processing is prohibited until when the specified cycle has reached. When the lapse time is longer than the monitoring cycle time, the priority of the monitoring is lowered. Accordingly, when the lapse time is shorter than the monitoring cycle time, the monitor processing is prohibited until when the specified cycle has reached, and when the lapse time is longer than the monitoring cycle time, the priority of the monitoring is lowered.

Further, the present invention can provide a peripheral unit for a programmable controller as follows. When the lapse time is longer than the monitoring cycle time, the monitoring cycle time is corrected so that the monitoring cycle time becomes longer. Accordingly, when the lapse time is longer than the monitoring cycle time, the monitoring cycle time is corrected so that the monitoring cycle time becomes longer.

BEST MODE FOR CARRYING OUT THE INVENTION

The present invention will be explained in detail with reference to the attached drawings. In the embodiments to be explained below, portions having identical structures to those of the above-described conventional example will be attached with the same legends used in the above conventional example.

Figure 1:
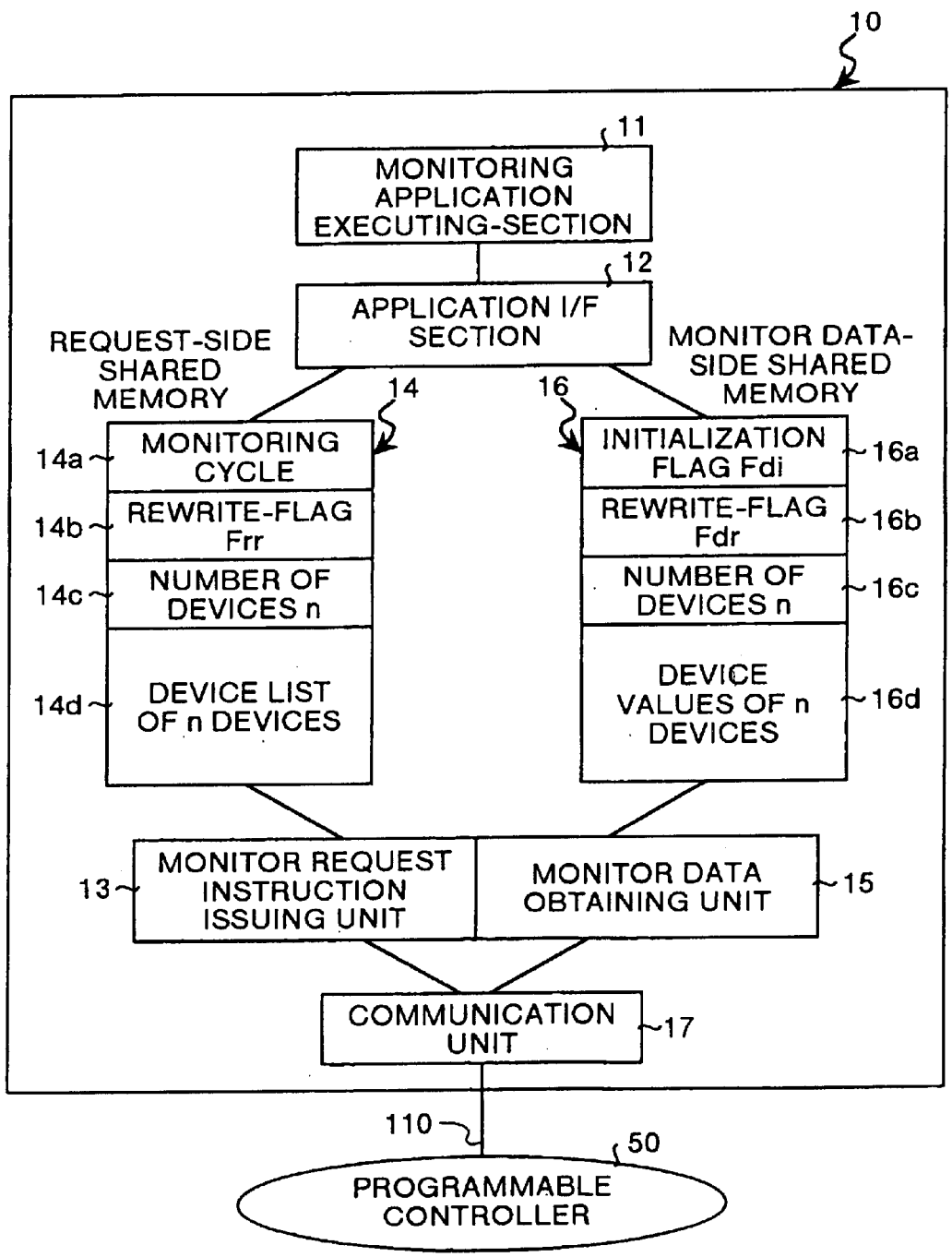
FIG. 1 is a block diagram showing a first embodiment of a peripheral unit for a programmable controller according to this invention.

FIG. 1 shows a first embodiment of a peripheral unit for a programmable controller according to the present invention. The peripheral unit 10 is connected to the programmable controller 50 to be monitored through a communication cable 110 for serial communications such as RS232C, for example, so that it is possible to communicate in two directions.

The peripheral unit 10 is constructed of a monitoring application executing-section 11 for monitoring a device of the programmable controller 50, an application interface section 12, a monitor request instruction issuing unit 13 for issuing a monitor request instruction to the programmable controller 50, a monitor request instruction issuing-side shared memory (hereinafter, this may be called a request-side shared memory) 14 provided between the application interface section 12 and the monitor request instruction issuing unit 13, monitor data obtaining unit 15 for obtaining monitor data from the programmable controller 50, a monitor data obtaining-side shared memory (hereinafter, this may be called a monitor data-side shared memory) 16 provided between the application interface section 12 and the monitor data obtaining unit 15, and communication unit 17 for communicating with the programmable controller 50.

The request-side shared memory 14 is for exchanging a list of devices to be monitored between the application interface section 12 and the monitor request instruction issuing unit 13. As an internal structure, the request-side shared memory 14 includes a monitor cycle section 14a for defining a monitoring cycle, a rewrite-flag section 14b for storing a rewrite-flag Frr that shows a rewriting of a device list, a number of devices section 14c, and a device list section 14d into which a list of devices to be monitored is written.

The monitor data-side shared memory 16 is for exchanging a value of a monitored device between the application interface section 12 and the monitor data obtaining unit 15, and has an initialization flag section 16a for storing an initialization flag Fdi that shows that monitor data after changing a device list has been written, a rewrite-flag section 16b for storing a rewrite-flag Fdr that shows a rewriting of monitor data, a number of devices section 16c, and a device value section 16d into which monitor data (a device value) obtained by the monitor data obtaining unit 15 is written.

The initialization flag Fdi falls at the time of changing a device list, and stands when monitor data has been written into the monitor data-side shared memory after the device list has been changed.

For each flag, that a flag stands means that a flag bit is "1" (ON), and that a flag falls means that a flag bit is "0" (OFF).

The monitor request instruction issuing unit 13 is for issuing a monitor request instruction according to the contents of a device list when the device list has been written into the request-side shared memory 14. When the rewrite-flag Frr of the request-side shared memory 14 stands, the monitor request instruction issuing unit 13 issues a monitor request instruction according to the contents of a new device list, and the rewrite-flag Frr falls. Until when the rewrite-flag Frr of the request-side shared memory 14 stands next, the monitor request instruction issuing unit 13 continues to issue the monitor request instruction according to the contents of the last device list in a monitoring cycle defined in the request-side shared memory 14.

The communication unit 17 is for conducting data communications with the programmable controller 50 in two directions via the communication cable 110 in a predetermined communication protocol. The communication unit 17 transmits a monitor request instruction issued by the monitor request instruction issuing unit 13 to the programmable controller 50, and receives monitor data (a device value) according to the monitor request instruction by the programmable controller 50. The monitor data obtaining unit 15 obtains monitor data received from the programmable controller 20.

The monitoring application executing-section 11 is given monitor data from the monitor data-side shared memory 16 via the application interface section 12 when both the initialization flag Fdi and the rewrite-flag Fdr are standing, and is not given monitor data from the monitor data-side shared memory 16 when the initialization flag Fdi has fallen even if the rewrite-flag Fdr is-standing.

Next, the operation of the first embodiment will be explained. When the monitoring application executing-section 11 has delivered a list of n devices to be monitored to the application interface section 12 and has made a monitoring request, the application interface section 12 writes the device list of the n devices received from the monitoring application executing-section 11 and the number of devices (n) of the device list into the number of devices section 14c and the device list section 14d of the request-side shared memory 14, and stands the rewrite-flag Frr of the rewrite-flag section 14b to indicate that the data has been written into the request-side shared memory 14.

The monitor request instruction issuing unit 13 monitors a state of the rewrite-flag Frr of the request-side shared memory 14. When the rewrite-flag Frr is standing, the monitor request instruction issuing unit 13 reads the number of devices n and the device list from the number of devices section 14c and the device list section 14d of the request-side shared memory 14, issues a monitor request instruction to the programmable controller 50 via the communication unit 17 based on this content, and falls the rewrite-flag Frr of the request-side shared memory 14.

When the monitor request instruction has been issued to the programmable controller 50, the programmable controller 50 returns a value of a device in the delivered device list to the monitor request instruction issuing unit 15 via the communication unit 17 according to the received monitor request instruction.

The monitor data obtaining unit 15 writes the received value of the device into the device value section 16d of the monitor data-side shared memory 16, and stands the rewrite-flag Fdr of the monitor data-side shared memory 16 to indicate that the data has been written into the monitor data-side shared memory 16. When a value of a device received for the first time has been written into the monitor data-side shared memory 16, the monitor data obtaining unit 15 also stands the initialization flag Fdi of the monitor data-side shared memory 16.

The application interface section 12 reads a value of the device from the monitor data-side shared memory 16 when the initialization flag Fdi of the monitor data-side shared memory 16 is standing, returns this value to the monitoring application executing-section 11, and falls the rewrite-flag Fdr of the monitor data-side shared memory 16.

Thereafter, each time when there has been a monitoring request from the monitoring application executing-section 11, the application interface section 12 compares the content of the device list written into the request-side shared memory 14 last time with the content of the device list received from the monitoring application executing-section 11 this time. When the contents of the device lists are the same, that is, when there has been no change in the device to be monitored, the application interface section 12 reads a value of the device from the monitor data-side shared memory 16, returns this value to the monitoring application executing-section 11, and falls the rewrite-flag Fdr of the monitor data-side shared memory 16.

On the other hand, when the contents of the device list are different, the application interface section 12 writes the device list received from the monitoring application executing-section 11 into the request-side shared memory 14, and stands the rewrite-flag Frr to indicate that the data has been written into the request-side shared memory 14. Then, the application interface section 12 falls the initialization flag Fdi of the monitor data-side shared memory 16, and refrains from returning the value of the device to the monitoring application executing-section 11 until when the initialization flag Fdi of the monitor data-side shared memory 16 has been stood by the monitor data obtaining unit 15.

The monitor request instruction issuing unit 13 continues to issue a monitor request instruction repeatedly to the programmable controller 50 via the communication unit 14 based on the last device list until when the rewrite-flag Frr of the request-side shared memory 14 stands, asynchronously with the application interface section 12, according to a monitoring cycle defined in the request-side shared memory 14.

Under this state, the monitor data obtaining unit 14 obtains a value of a device returned from the programmable controller 50 based on the monitor request instruction issued by the monitor request instruction issuing unit 13, writes this value into the monitor data-side shared memory 16, and stands the rewrite-flag Fdr to indicate that the data has been written.

When the rewrite-flag Frr of the request-side shared memory 14 stands based on a change in the content of the device list, the monitor request instruction issuing unit 13 reads the device list of the request-side shared memory 14, issues a new monitor request instruction to the programmable controller 50 via the communication unit 17 based on the device list, and falls the rewrite-flag Frr of the request-side shared memory 14.

At this time, the monitor data obtaining unit 14 obtains a value of a device returned from the programmable controller 50 based on the monitor request instruction issued by the monitor request instruction issuing unit 13, writes this value into the monitor data-side shared memory 16, and stands the rewrite-flag Fdr of the monitor data-side shared memory 16 to indicate that the data has been written, and at the same time, stands the initialization flag Fdi of the monitor data-side shared memory 16.

As described above, as the monitor request instruction issuing unit 13 and the monitor data obtaining unit 15 to the monitoring application executing-section 11 and the application interface section 12 have been divided by the request-side shared memory 14 and the monitor data-side shared memory 16, the monitoring application executing-section 11, the monitor request instruction issuing unit 13 and the monitor data obtaining unit 15 can operate mutually asynchronously. Further, it is possible to monitor based on minimum necessary data exchanges. Thus, it is possible to obtain an effect of improving the response in the monitoring application without depending on the actual communication time between the programmable controller 50 and the peripheral unit 10.

Further, according to data to be transferred, the memory is divided into the request-side shared memory 14 and the monitor data-side shared memory 16. Therefore, data flow becomes in one direction, and an exclusive control relating to the shared memories can also be minimized. As a result, it is possible to obtain an effect of a reduction in the monitoring processing time and an improvement in the reliability of memory access.

Figure 2:
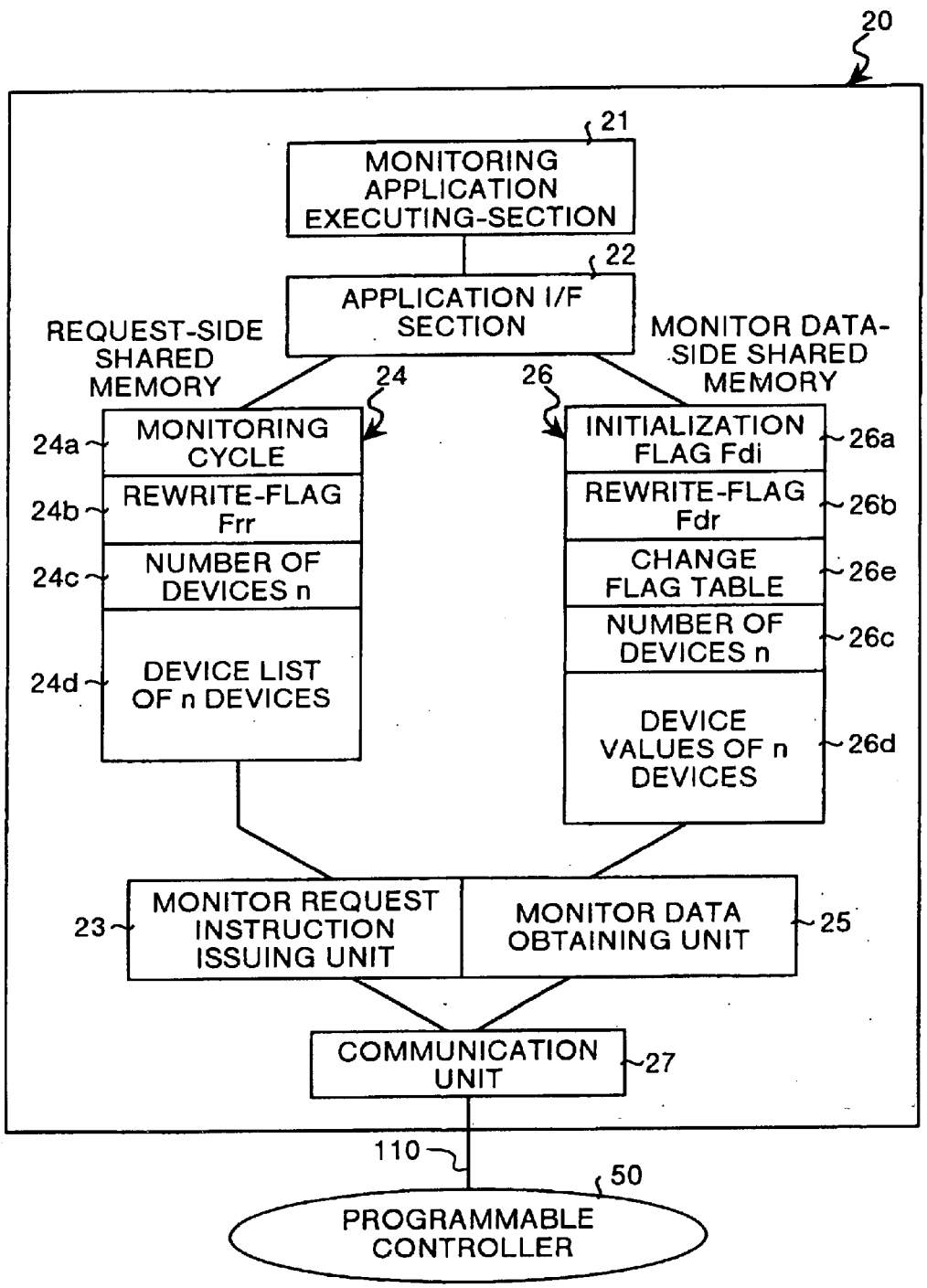
FIG. 2 is a block diagram showing a second embodiment of a peripheral unit for a programmable controller according to this invention.

FIG. 2 shows a second embodiment of a peripheral unit for a programmable controller according to this invention. The peripheral unit 20 is connected to the programmable controller 50 to be monitored through the communication cable 110 for serial communications such as RS232C, for example, so that it is possible to-communicate in two directions.

The peripheral unit 20 is constructed of a monitoring application executing-section 21 for monitoring a device of the programmable controller 50, an application interface section 22, monitor request instruction issuing unit 23 for issuing a monitor request instruction to the programmable controller 50, a monitor request instruction issuing-side shared memory (hereinafter, this may be called a request-side shared memory) 24 provided between the application interface section 22 and the monitor request instruction issuing unit 23, monitor data obtaining unit 25 for obtaining monitor data from the programmable controller 50, a monitor data obtaining-side shared memory (hereinafter, this may be called a monitor data-side shared memory) 26 provided between the application interface section 22 and the monitor data obtaining unit 25, and a communication unit 27 for communicating with the programmable controller 50.

The request-side shared memory 24 is for exchanging a list of devices to be monitored between the application interface section 22 and the monitor request instruction issuing unit 23. As an internal structure, in a similar manner to the first embodiment, the request-side shared memory 24 includes a monitor cycle section 24a, a rewrite-flag section 24b for storing a rewrite-flag Frr that shows a rewriting of a device list, a number of devices section 24c, and a device list section 24d.

The monitor data-side shared memory 26 is for exchanging a value of a monitored device between the application interface section 22 and the monitor data obtaining unit 25, and has an initialization flag section 26a for storing an initialization flag Fdi that shows an initialization of monitor data following a change in the device list, a rewrite-flag section 26b for storing a rewrite-flag Fdr that shows a rewriting of monitor data, change flag table section 26e for storing a change flag table, a number of devices section 26c, and a device value section 26d.

Figure 3:
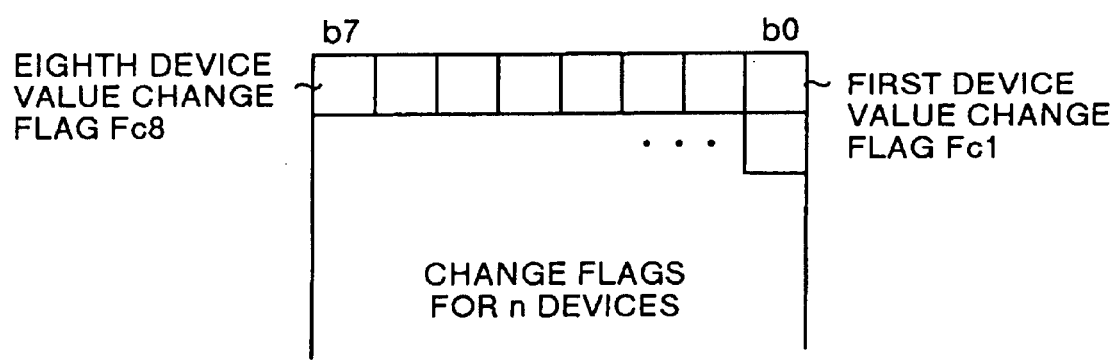
FIG. 3 is an explanatory diagram showing an internal structure of a change flag table.

The change flag table of the change flag table section 26e stores device value change flags Fc1 to Fcn that show changes in individual device values for each of n devices of the device list as shown in FIG. 3. Each of the device value change flags Fc1 to Fcn stands when a device value has changed, and falls when a device value has been read. The monitor data obtaining unit 25 updates data of the monitor data-side shared memory 26 for only a device value of a device of which device value has changed, and stands a device value change flag.

The difference between this second embodiment and the above-explained first embodiment is the functions of the application interface section 22, the monitor data obtaining unit 25 and the monitor data-side shared memory 26. Functions of the other components are practically the same as those of the first embodiment.

Next, the operation of the second embodiment will be explained. When the monitoring application executing-section 21 has delivered a list of devices to be monitored to the application interface section 22 and has made a monitoring request, the application interface section 22 writes the received device list into the request-side shared memory 24, and stands the rewrite-flag Frr to indicate that the data has been written. When the rewrite-flag Frr of the request-side shared memory 24 is standing, the monitor request instruction issuing unit 23 reads the device list of the request-side shared memory 24, issues a monitor request instruction to the programmable controller 50 via the communication unit 27 based on the content of the device list, and falls the rewrite-flag Frr of the request-side shared memory 24.

When the monitor request instruction has been issued to the programmable controller 50, the programmable controller 50 returns a value of a device in the delivered device list to the monitor request instruction issuing unit 25 via the communication unit 27 according to the received monitor request instruction.

The monitor data obtaining unit 25 writes the received value of the device into the device value section 26d of the monitor data-side shared memory 26, and stands the rewrite-flag Fdr of the monitor data-side shared memory 26 to indicate that the data has been written into the monitor data-side shared memory 26. When a value of a device received for the first time has been written into the monitor data-side shared memory 26, the monitor data obtaining unit 25 also stands the initialization flag Fdi of the monitor data-side shared memory 26. The operation up to this stage is the same as that of the first embodiment.

The application interface section 22 reads all the values of the devices from the monitor data-side shared memory 26 when the initialization flag Fdi of the monitor data-side shared memory 26 is standing, returns these values to the monitoring application executing-section 21, and falls the rewrite-flag Fdr of the monitor data-side shared memory 26.

Thereafter, when the monitor data obtaining unit 25 obtains a device value returned from the programmable controller 50, the monitor data obtaining unit 25 compares a latest device value with a device value obtained last time. Only when the devices values are different, the monitor data obtaining unit 25 reflects only a changed device value to the monitor data-side shared memory 26, and stands a device value change flag Fc corresponding to the device of the changed value in the change flag table of the change flag table section 26e.

During a period while the initialization flag Fdi of the monitor data-side shared memory 26 is standing, the application interface section 22 obtains only the value of the device of which device value change flag Fc is standing in the change flag table, by referring to the change flag table of the monitor data-side shared memory 26, delivers the value to the monitoring application executing-section 21, and falls the device value change flag Fc corresponding to the device of which device value has been obtained.

According to the second embodiment, the device value change flags Fc1 to Fcn that show individual device value changes are stored for each device to be monitored in the monitor data-side shared memory 26, and the application interface section 22 obtains only a value of the device of which device value change flag Fc is standing. Therefore, it becomes possible to minimize the reading of device values to be exchanged between the monitoring application executing-section 21, the application interface section 22 and the monitor data obtaining unit 25. As a result, it is possible to obtain an effect of a reduction in the monitoring processing time and an improvement in the response in the monitoring application.

Figure 4:
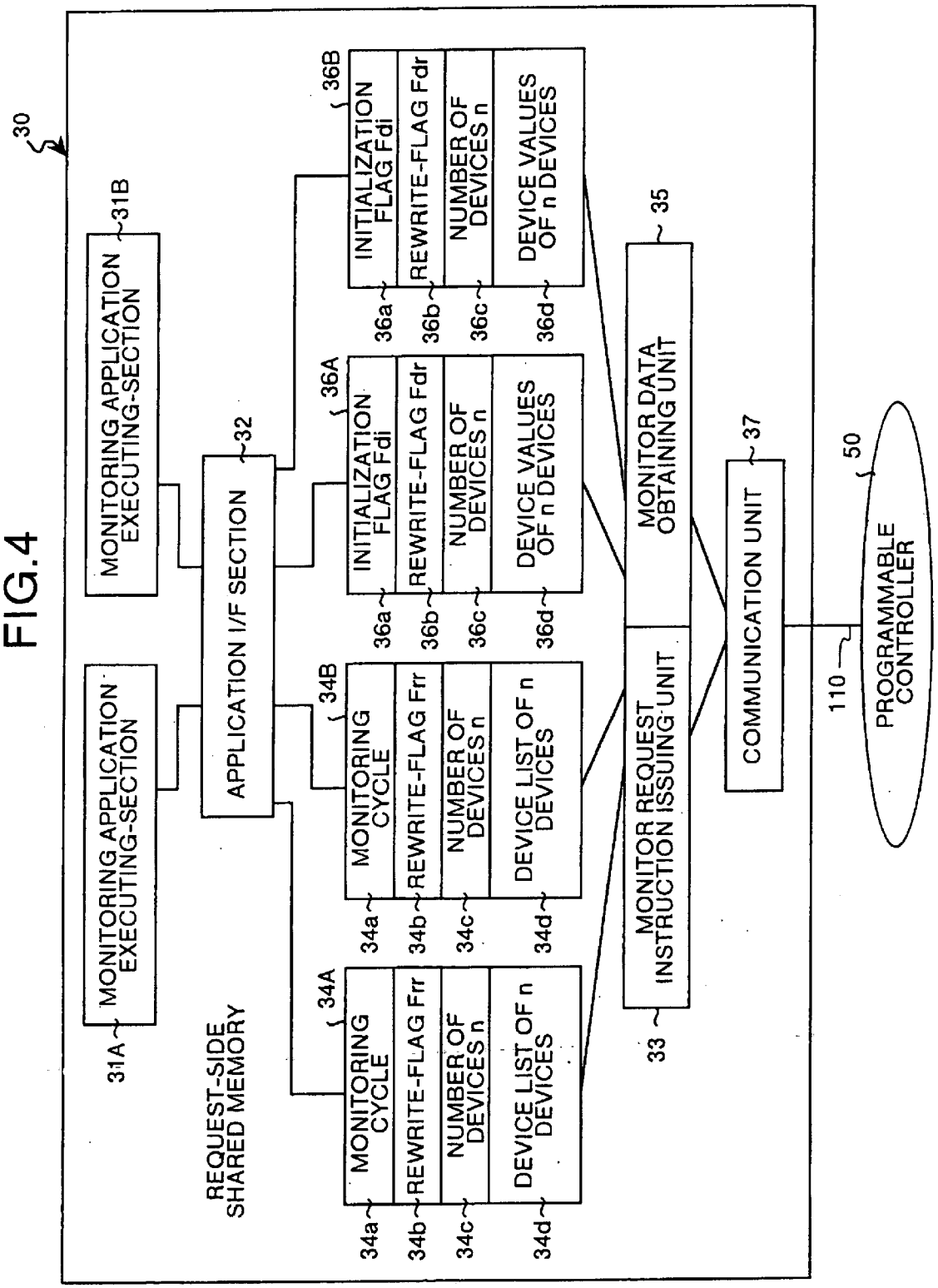
FIG. 4 is a block diagram showing a third embodiment of a peripheral unit for a programmable controller according to this invention.

FIG. 4 shows a third embodiment of a peripheral unit for a programmable controller according to this invention. The peripheral unit 30 is connected to a programmable controller 50 to be monitored through the communication cable 110 for serial communications such as RS232C, for example, so that it is possible to communicate in two directions.

The peripheral unit 30 is constructed of a plurality of monitoring application executing-sections 31A and 31B for monitoring a device of the programmable controller 50, an application interface section 32, a monitor request instruction issuing unit 33 for issuing a monitor request instruction to the programmable controller 50, monitor request instruction issuing-side shared memories (hereinafter, they may be called request-side shared memories) 34A and 34B provided between the application interface section 32 and the monitor request instruction issuing unit 33 for each monitoring application executing-section, a monitor data obtaining unit 35 for obtaining monitor data from the programmable controller 50, monitor data obtaining-side shared memories (hereinafter, they may be called monitor data-side shared memories) 36A and 36B provided between the application interface section 32 and the monitor data obtaining unit 35 for each monitoring application executing-section, and a communication unit 37 for communicating with the programmable controller 50.

Each of the request-side shared memories 34A and 34B is for exchanging a list of devices to be monitored between the application interface section 32 and the monitor request instruction issuing unit 33. As an internal structure, each request-side shared memory includes a monitor cycle section 34a, a rewrite-flag section 34b for storing a rewrite-flag Frr that shows a rewriting of a device list, a number of devices section 34c, and a device list section 34d.

Each of the monitor data-side shared memories 36A and 36B is for exchanging a value of a monitored device between the application interface section 32 and the monitor data obtaining unit 35, and has an initialization flag section 36a for storing an initialization flag Fdi that shows that monitor data after changing a device list has been written, a rewrite-flag section 36b for storing a rewrite-flag Fdr that shows a rewriting of monitor data, a number of devices section 36c, and a device value section 36d.

The request-side shared memory 34A and the monitor data-side shared memory 36A are for the monitoring application executing-section 31A, and the request-side shared memory 34B and the monitor data-side shared memory 36B are for the monitoring application executing-section 31B.

The monitor request instruction issuing unit 33 integrates the same devices based on request device lists of request origins and the programmable controller 50, thereby optimizing device lists.

Next, the operation of the third embodiment will be explained. The monitoring application executing-section 31A delivers a list of devices to be monitored to the application interface section 32 and makes a monitoring request. The application interface section 32 writes the received device list into the request-side shared memory 34A, and stands a rewrite-flag Frr of the request-side shared memory 34A to indicate that the data has been written.

Similarly, monitoring application executing-section 31B delivers a list of devices to be monitored to the application interface section 32 and makes a monitoring request. The application interface section 32 writes the received device list into the request-side shared memory 34B, and stands a rewrite-flag Frr of the request-side shared memory 34B to indicate that the data has been written. When the rewrite-flag Frr of the request-side shared memory 34A is standing, the monitor request instruction issuing unit 33 reads the device list of the request-side shared memory 34A, and when the rewrite-flag Frr of the request-side shared memory 34B is standing, the monitor request instruction issuing unit 33 reads the device list of the request-side shared memory 34B.

Figure 5:
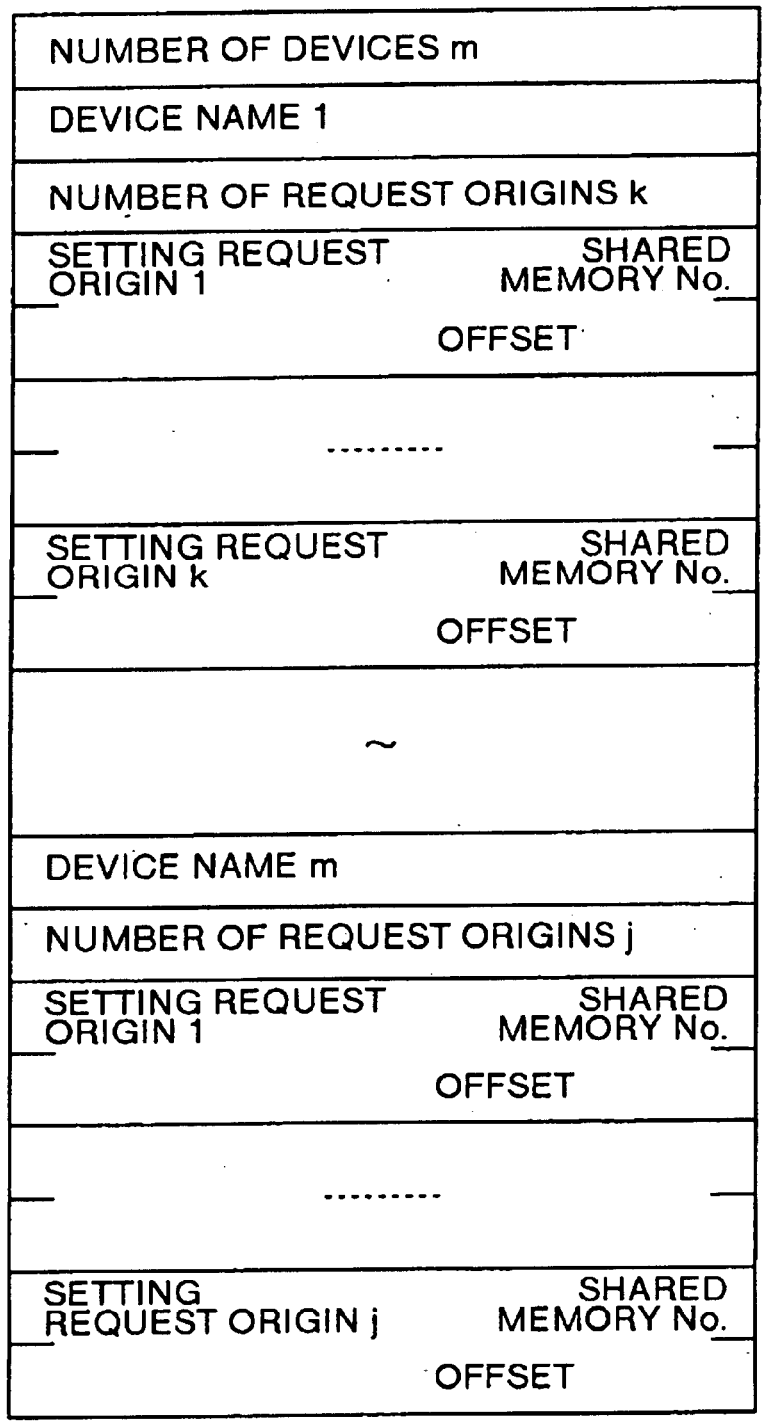
FIG. 5 is an explanatory diagram showing an optimized device list.

Then, first based on the device list read from the request-side shared memory 34A, an optimized device list is generated. In the optimized device list, as shown in FIG. 5, a shared memory number of a request origin and offset information showing the order in the device list are set and a device name is registered for each device to be monitored. In this case, 1 is set as the number of request origins.

Next, the device list read from the request-side shared memory 34B is compared with an optimized device list registered last time. When there exists the same device, a shared memory number of a request origin and offset information for showing the order in the device list are added to an item of the corresponding device name in the optimized device list, and the number of request origins is added by +1. When there does not exist the same device, a shared memory number of a request origin and offset information for showing the order in the device list are set to this device and a device name is registered. In this case, 1 is set as the number of request origins.

Thereafter, the monitor request instruction issuing unit 33 issues a monitor request instruction to the programmable controller 50 via the communication unit 37 based on the generated optimized device list, and falls the rewrite-flags Frr of the request-side shared memory 34A and the request-side shared memory 34B respectively.

The programmable controller 50 returns the values of the devices in the delivered optimized device list to the monitor data obtaining unit 35 via the communication unit 37 according to the received monitor request instruction. The monitor data obtaining unit 35 writes the received values of devices by allocating them into the monitor data-side shared memory 36A and the monitor data-side shared memory 36B of request origins according to the optimized device list generated by the monitor request instruction issuing unit 33 and, at the same time, stands a rewrite-flag Fdr to indicate that the data have been written. When values of devices received for the first time have been written into the monitor data-side shared memories 36A and 36B, the initialization flags Fdi of the monitor data-side shared memories 36A and 36B are stood.

The application interface section 32 reads a value of the device from the monitor data-side shared memory 36A when the initialization flag Fdi of the monitor data-side shared memory 36A is standing, returns this value to the monitoring application executing-section 31A, and falls the rewrite-flag Fdr of the monitor data-side shared memory 36A.

Similarly, the application interface section 32 reads a value of the device from the monitor data-side shared memory 36B when the initialization flag Fdi of the monitor data-side shared memory 36B is standing, returns this value to the monitoring application executing-section 31B, and falls the rewrite-flag Fdr of the monitor data-side shared memory 36B. Thereafter, each time when there has been a monitoring request from the monitoring application executing-section 31A, the application interface section 32 compares the content of the device list written into the request-side shared memory 34A last time with the content of the device list received from the monitoring application executing-section 31A this time. When the contents of the device lists are the same, the application interface section 32 reads a value of the device from the monitor data-side shared memory 36A, returns this value to the monitoring application executing-section 31A, and falls the rewrite-flag Fdr of the monitor data-side shared memory 36A.

Similarly, each time when there has been a monitoring request from the monitoring application executing-section 31B, the application interface section 32 compares the content of the device list written into the request-side shared memory 34B last time with the content of the device list received from the monitoring application executing-section 31B this time. When the contents of the device lists are the same, the application interface section 32 reads a value of the device from the monitor data-side shared memory 36B, returns this value to the monitoring application executing-section 31B, and falls the rewrite-flag Fdr of the monitor data-side shared memory 36B.

On the other hand, when the contents of the device list are different, the application interface section 32 writes the device list received from the monitoring application executing-section 31A into the request-side shared memory 34A, and stands the rewrite-flag Frr of the request-side shared memory 34A to indicate that the data has been written. Then, the application interface section 32 falls the initialization flag Fdi of the monitor data-side shared memory 36A, and refrains from returning the value of the device to the monitoring application executing-section 31A until when the initialization flag Fdi of the monitor data-side shared memory 36A has been stood by the monitor-data obtaining unit 35.

Similarly, the application interface section 32 writes the device list received from the monitoring application executing-section 31B into the request-side shared memory 34B, and stands the rewrite-flag Frr of the request-side shared memory 34B to indicate that the data has been written. Then, the application interface section 32 falls the initialization flag Fdi of the monitor data-side shared memory 36B, and refrains from returning the value of the device to the monitoring application executing-section 31B until when the initialization flag Fdi of the monitor data-side shared memory 36B has been stood by the monitor data obtaining unit 35.

The monitor request instruction issuing unit 33 continues to issue a monitor request instruction repeatedly to the programmable controller 50 via the communication unit 37 based on the last optimized device list until when the rewrite-flag Frr of the request-side shared memory 34A or the request-side shared memory 34B stands, asynchronously with the application interface section 32, according to a monitoring cycle defined in the request-side shared memory 34A.

Under this state, the monitor data obtaining unit 35 obtains a value of a device returned from the programmable controller 50 based on the monitor request instruction issued by the monitor request instruction issuing unit 33, writes this value into the monitor data-side shared memory 36A or 36B, and stands the rewrite-flag Fdr to indicate that the data has been written.

When the rewrite-flag Frr of the request-side shared memory 34A stands based on a change in the content of the device list, the monitor request instruction issuing unit 33 reads the device list of the request-side shared memory 34A, regenerates an optimized device list generated last time, issues a monitor request instruction to the programmable controller 50 via the communication unit 37 based on the optimized device list, and falls the rewrite-flag Frr of the request-side shared memory 34A.

At this time, the monitor data obtaining unit 35 obtains a value of a device returned from the programmable controller 50 based on the monitor request instruction issued by the monitor request instruction issuing unit 33, writes this value into the monitor data-side shared memory 36A, stands the rewrite-flag Fdr of the monitor data-side shared memory 36A to indicate that the data has been written, and stands the initialization flag Fdi of the monitor data-side shared memory 36A.

Similarly, when the rewrite-flag Frr of the request-side shared memory 34B stands, the monitor request instruction issuing unit 33 reads the device list of the request-side shared memory 34B, regenerates an optimized device list generated last time, issues a monitor request instruction to the programmable controller 50 via the communication unit 37 based on the optimized device list, and falls the rewrite-flag Frr of the request-side shared memory 34B.

At this time, the monitor data obtaining unit 35 obtains a value of a device returned from the programmable controller 50 based on the monitor request instruction issued by the monitor request instruction issuing unit 33, writes this value into the monitor data-side shared memory 36B, stands the rewrite-flag Fdr of the monitor data-side shared memory 36B to indicate that the data has been written, and stands the initialization flag Fdi of the monitor data-side shared memory 36B.

As described above, according to the third embodiment, the respective shared memories of the request side and the monitor data side-are used by the number of request monitor applications, and the device list is optimized by the monitor request instruction issuing unit 33. Therefore, it becomes possible to restrict an increase in the number of processing at the application interface section 32 side. Even if the number of monitoring applications has increased, it is possible to obtain an effect of a reduction in the monitoring processing time and an improvement in the response in the monitoring application. Further, as the monitor request instruction issuing unit 33 optimizes the monitoring request list, it becomes possible to reduce both the volume of transmission data and the number of communications to the programmable controller 50. Therefore, it is also possible to obtain an effect of an improvement in the communication processing time and a reduction in the processing load of the programmable controller.

Figure 6:
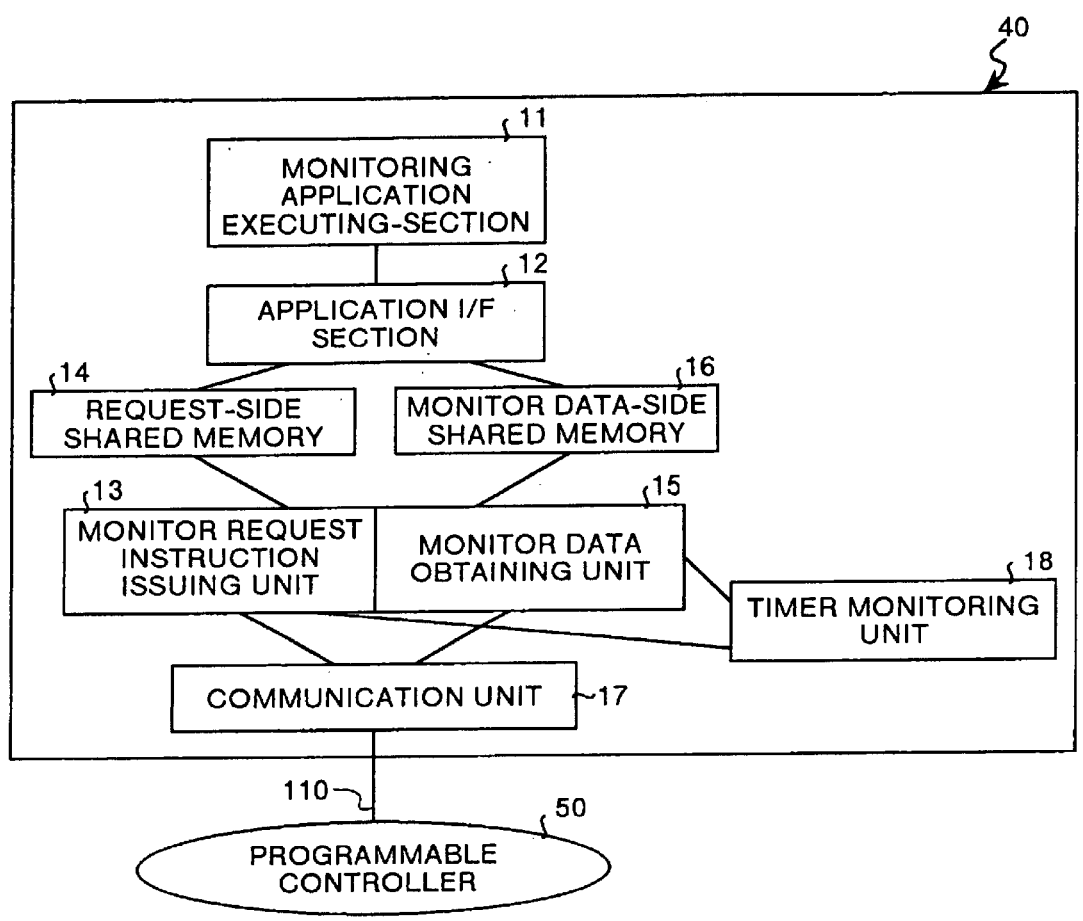
FIG. 6 is a block diagram showing a fourth embodiment of a peripheral unit for a programmable controller according to this invention.
Figure 7:
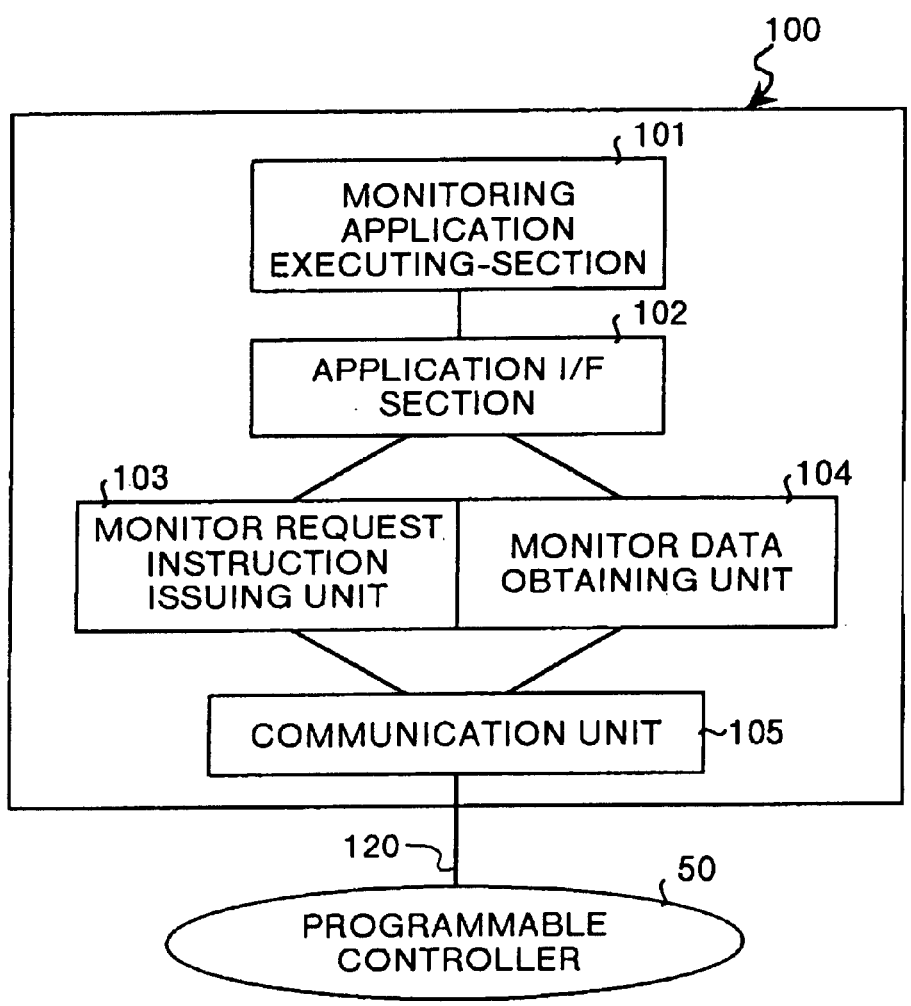
FIG. 7 is a block diagram showing a conventional peripheral unit for a programmable controller.

FIG. 6 shows a fourth embodiment of a peripheral unit for a programmable controller according to this invention. In FIG. 6, portions corresponding to those in FIG. 1 are provided with the same legends as those provided in FIG. 1, and their explanation will be omitted.

The peripheral unit 40 is connected to the programmable controller 50 to be monitored through the communication cable 110 for serial communications such as RS232C, for example, so that it is possible to communicate in two directions.

In a similar manner to that of the first embodiment, the peripheral unit 40 has the monitoring application executing-section 11, the application interface section 12, the monitor request instruction issuing unit 13, the request-side shared memory 14, the monitor data obtaining unit 15, the monitor data-side shared memory 16, and the communication unit 17. Further, the peripheral unit has timer monitoring unit 18 for measuring an operation time of the monitor request instruction issuing unit 13 and the monitor data obtaining unit 15 by an internal clock counter respectively.

The timer monitoring unit 18 measures a lapse time (a time required for obtaining monitor data) from when the monitor request instruction issuing unit 13 has issued a monitor request instruction till when the monitor data obtaining unit 15 has obtained the monitor data. The timer monitoring unit 18 compares a predetermined monitoring cycle time with a time required for obtaining the monitor data, and carries out a correction of the monitoring cycle time as follows. When the time required for obtaining the monitor data is shorter than the monitoring cycle time, the timer monitoring unit 18 stops the monitoring processing until when the specified cycle has reached. When the time required for obtaining the monitor data is longer than the monitoring cycle time, the priority of the monitoring is lowered to take a longer monitoring cycle time.

The operation of the fourth embodiment will be explained next. When the monitoring application executing-section 11 has delivered a list of devices to be monitored to the application interface section 12 and has made a monitoring request, the application interface section 12 writes the device list received from the monitoring application executing-section 11 into the request-side shared memory 14, and stands the rewrite-flag Frr of the rewrite-flag section 14b to indicate that the data has been written into the request-side shared memory 14.

When the rewrite-flag Frr of the monitor data-side shared memory 14 is standing, the monitor request instruction issuing unit 13 reads the device list of the monitor data-side shared memory 14, issues a monitor request instruction to the programmable controller 50 via the communication unit 17 based on this content, and falls the rewrite-flag Frr of the request-side shared memory 14. At the same time, the monitor request instruction issuing unit 13 posts the timer monitoring unit 18 to inform that the monitor request instruction has been issued. Then, the timer monitoring unit 18 starts a measuring of a time required for obtaining monitor data.

When the monitor request instruction has been issued to the programmable controller 50, the programmable controller 50 returns a value of a device in the delivered device list to be monitored to the monitor request instruction issuing unit 15 via the communication unit 17 according to the received monitor request instruction.

The monitor data obtaining unit 15 writes the received value of the device into the monitor data-side shared memory 16, and stands the rewrite-flag Fdr of the monitor data-side shared memory 16 to indicate that the data has been written into the monitor data-side shared memory 16. When a value of a device received for the first time has been written into the monitor data-side shared memory 16, the monitor data obtaining unit 15 also stands the initialization flag Fdi of the monitor data-side shared memory 16. At the same time, the monitor data obtaining unit 15 posts the timer monitoring unit 18 to inform that the monitor data has been obtained. Thus, the timer monitoring unit 18 measures a time taken from when the timer monitoring unit 18 has received the post from the monitor request instruction issuing unit 13 till when the timer monitoring unit 18 has received the post from the monitor data obtaining unit 15, and calculates the lapse of time, that is, the time taken for obtaining the monitor data.

The application interface section 12 reads a value of the device from the monitor data-side shared memory 16 when the initialization flag Fdi of the monitor data-side shared memory 16 is standing, returns this value to the monitoring application executing-section 11, and falls the rewrite-flag Fdr of the monitor data-side shared memory 16.

Thereafter, each time when there has been a monitoring request from the monitoring application executing-section 11, the application interface section 12 compares the content of the device list written into the request-side shared memory 14 last time with the content of the device list received from the monitoring application executing-section 11 this time. When the contents of the device lists are the same, the application interface section 12 reads a value of the device from the monitor data-side shared memory 16, returns this value to the monitoring application executing-section 11, and falls the rewrite-flag Fdr of the monitor data-side shared memory 16.

On the other hand, when the contents of the device list are different, the application interface section 12 writes the device list received from the monitoring application executing-section 11 into the request-side shared memory 14, and stands the rewrite-flag Frr to indicate that the data has been written into the request-side shared memory 14. Then, the application interface section 12 falls the initialization flag Fdi of the monitor data-side shared memory 16, and refrains from returning the value of the device to the monitoring application executing-section 11 until when the initialization flag Fdi of the monitor data-side shared memory 16 has been stood by the monitor data obtaining unit 15.

The monitor request instruction issuing unit 13 continues to issue a monitor request instruction repeatedly to the programmable controller 50 via the communication unit 14 based on the last device list until when the rewrite-flag Frr of the request-side shared memory 14 stands, asynchronously with the application interface section 12, according to a monitoring cycle defined in the request-side shared memory 14.

Under this state, the monitor data obtaining unit 15 obtains a value of a device returned from the programmable controller 50 based on the monitor request instruction issued by the monitor request instruction issuing unit 13, writes this value into the monitor data-side shared memory 16, and stands the rewrite-flag Fdr to indicate that the data has been written.

When the rewrite-flag Frr of the request-side shared memory 14 stands based on a change in the content of the device list, the monitor request instruction issuing unit 13 reads the device list of the request-side shared memory 14, issues a new monitor request instruction to the programmable controller 50 via the communication unit 17 based on the device list, and falls the rewrite-flag Frr of the request-side shared memory 14.

At this time, the monitor data obtaining unit 14 obtains a value of a device returned from the programmable controller 50 based on the monitor request instruction issued by the monitor request instruction issuing unit 14, writes this value into the monitor data-side shared memory 16, and stands the rewrite-flag Fdr of the monitor data-side shared memory 16 to indicate that the data has been written, and at the same time, stands the initialization flag Fdi of the monitor data-side shared memory 16.

At this time, when the time elapsed from when the monitor request instruction was issued till when the monitor data was obtained that has been calculated by the timer monitoring unit 18 is shorter than the monitoring cycle time defined by the request-side shared memory 14, the issuing of a monitor request instruction by the monitor request instruction issuing unit 13 is stopped until when the difference time has elapsed. During this difference period, the occupancy of the processor is released so that other application can be operated.

On the other hand, when the time elapsed from when the monitor request instruction was issued till when the monitor data was obtained that has been calculated by the timer monitoring unit 18 is longer than the monitoring cycle time defined by the request-side shared memory 14, a monitor request instruction is issued immediately from the monitor request instruction issuing unit 13. At the same time, the occupancy priority of the processor is lowered so that other applications can be operated, and the monitoring cycle time defined in the request-side shared memory 14 is made slightly shorter.

Therefore, according to this embodiment, the timer monitoring unit 18 measures the processing time required by the monitor request instruction issuing unit 13 and the monitor data obtaining unit 15, and compares this time with the monitoring cycle time. As a result, there is an effect that it is possible to avoid an unprepared setting of processing priority to the monitor request instruction issuing unit 13 and the monitor data obtaining unit 15, so that it is possible to prevent the operation of other applications from being interfered.

Industrial applicability

As described above, the peripheral unit for a programmable controller relating to the present invention is effective as a peripheral unit for monitoring a device of a programmable controller that is used for a sequence control in various industrial machines and machine tools.

What is claimed is:

1. A peripheral unit for monitoring a device of a programmable controller, said peripheral unit comprising:

a monitor request instruction issuing-side shared memory into which a list of devices to be monitored is written according to a monitor request instruction of a monitoring application executing-section;

a monitor request instruction issuing unit for issuing the monitor request instruction according to a content of the device list after the device list has been written into said monitor request instruction issuing-side shared memory;

a communication unit for transmitting a monitor request instruction issued by said monitor request instruction issuing unit to said programmable controller and for receiving the monitor data according to the monitor request instruction from said programmable controller;

a monitor data obtaining unit for obtaining the monitor data received from said programmable controller; and a monitor data obtaining-side shared memory into which the monitor data obtained by said monitor data obtaining unit is written, wherein said-monitoring application executing-section is given the monitor data from said monitor data obtaining-side shared memory.

2. The peripheral unit according to claim 1, wherein said monitor request instruction issuing-side shared memory has a rewrite-flag section for storing a rewrite-flag that shows a rewriting of the device list, said monitor request instruction issuing unit issues a monitor request instruction according to the contents of a new device list when a rewrite-flag of the monitor request instruction issuing-side shared memory has been stood and falls the last rewrite-flag, and continues to issue the monitor request instruction according to the contents of the last device list until when a next rewrite-flag of said monitor request instruction issuing-side shared memory has been stood;

said monitor data obtaining-side shared memory has initialization flag section for storing an initialization flag that falls when the device list is changed and that stands when monitor data has been written into said monitor data obtaining-side shared memory after the device list has been changed; and a rewrite-flag section for storing a rewrite-flag that stands when the monitor data of said monitor data obtaining-side shared memory has been rewritten by said monitor data obtaining unit and that falls when this monitor data has been read by said monitoring application executing-section, and said monitoring application executing-section is given the monitor data from said monitor data obtaining-side shared memory when both the initialization flag and the rewrite-flag of said monitor data obtaining-side shared memory have been stood, and is not given the monitor data from said monitor data obtaining-side shared memory when the initialization flag has fallen.

3. The peripheral unit according to claim 1, wherein said monitor data obtaining-side shared memory has a change flag table section for storing a device value change flag that is set for each device of a device list and that stands when the device value has changed and falls when the device value has been read, said monitor data obtaining unit updates only the device value of said monitor data obtaining-side shared memory for a device of which device value has changed, and stands a device value change flag, and said monitoring application executing-section is given a device value of a device for which a device value change flag is standing, from said monitor data obtaining-side shared memory.

4. The peripheral unit according to claim 1, wherein a plurality of said monitoring application executing-sections are provided as monitoring request origins, said monitor request instruction issuing-side shared memory and said monitor data obtaining-side shared memory are provided by a plurality of numbers respectively corresponding to said monitoring application executing-sections, and said monitor request instruction issuing unit integrates the same devices based on request device lists of request origins and said programmable controller, thereby optimizing device lists.

5. The peripheral unit according to claim 1, further comprising a timer monitoring unit for measuring a lapse time from when a monitor request instruction has been issued till when the monitor data has been obtained, wherein a predetermined monitoring cycle time is compared with a lapse time measured by said timer monitoring unit, when the lapse time is shorter than the monitoring cycle time, the monitor is prohibited until when the specified cycle has reached, and when the lapse time is longer than the monitoring cycle time, the priority of the monitoring is lowered.

6. The peripheral unit according to claim 5, wherein when the lapse time is longer than the monitoring cycle time, the monitoring cycle time is corrected so that the monitoring cycle time becomes longer.

* * * * *